US010718645B2

(12) United States Patent
Zarkan et al.

(10) Patent No.: US 10,718,645 B2
(45) Date of Patent: Jul. 21, 2020

(54) ADJUSTABLE TRANSDUCER ASSEMBLIES (71) Applicant: Daniel Measurement and Control, Inc., Houston, TX (US)

(72) Inventors: Mohamed Zarkan, Kallo (BE); David Bruce Stevens, Katy, TX (US); Cleef Vixamar, Katy, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 0 days.

(21) Appl. No.: 16/140,504

(22) Filed: Sep. 24, 2018

(65) Prior Publication Data

US 2019/0128714 A1 May 2, 2019

Related U.S. Application Data (60) Provisional application No. 62/578,376, filed on Oct. 27, 2017.

(51) Int. Cl.
| | |
|---|---|
| *G01F 1/66* | (2006.01) |
| *G01F 1/74* | (2006.01) |
| *B06B 1/06* | (2006.01) |
| *G10K 11/02* | (2006.01) |
| *G01F 7/00* | (2006.01) |
| *B06B 1/02* | (2006.01) |

(52) U.S. Cl.
CPC ............ *G01F 1/662* (2013.01); *B06B 1/0215* (2013.01); *B06B 1/0607* (2013.01); *B06B 1/0644* (2013.01); *G01F 1/667* (2013.01); *G01F 1/74* (2013.01); *G01F 7/00* (2013.01); *G10K 11/02* (2013.01); *B06B 2201/55* (2013.01)

(58) Field of Classification Search
None
See application file for complete search history.

(56) References Cited

U.S. PATENT DOCUMENTS 5,484,416 A * 1/1996 Gittings ............... A61B 8/0833
604/164.08
2010/0257942 A1* 10/2010 Straub, Jr. ........... H01L 41/0475
73/861.28

(Continued)

FOREIGN PATENT DOCUMENTS

| CN | 101243558 A | 8/2008 |
|---|---|---|
| CN | 102792132 A | 11/2012 |

(Continued)

OTHER PUBLICATIONS

Chinese Patent Application No. 201811249822.8 Office Action dated Feb. 3, 2020 (22 pages).

Primary Examiner — Harshad R Patel
(74) Attorney, Agent, or Firm — Conley Rose, P.C.

(57) ABSTRACT

An ultrasonic flow meter for measuring the flow of a fluid includes a transducer assembly having an adjustable length. The transducer assembly is positioned in a transducer port in the meter body and includes a piezoelectric capsule axially positioned adjacent a first end of the transducer assembly. The piezoelectric capsule includes a transformer, a piezoelectric element axially spaced from the transformer, and axially-extendable wireway. A conductor extends through the extendable wireway and electrically couples the piezoelectric element with the transformer.

16 Claims, 6 Drawing Sheets

(56) References Cited

U.S. PATENT DOCUMENTS

2010/0313676 A1* 12/2010 Straub, Jr. ............... G01F 1/662
  73/861.28
2016/0070016 A1* 3/2016 Wang .................. E21B 47/0007
  73/152.28
2018/0080597 A1* 3/2018 Weldon .................. F16M 11/14

FOREIGN PATENT DOCUMENTS

WO     2007/021450 A2    2/2007
WO     2011/084912 A2    7/2011

* cited by examiner

ADJUSTABLE TRANSDUCER ASSEMBLIES

CROSS-REFERENCE TO RELATED APPLICATIONS

This application claims benefit of U.S. provisional patent application Ser. No. 62/578,376 filed Oct. 27, 2017, and entitled "Adjustable Transducer Assemblies," which is hereby incorporated herein by reference in its entirety for all purposes.

STATEMENT REGARDING FEDERALLY SPONSORED RESEARCH OR DEVELOPMENT

Not applicable.

BACKGROUND

Field of the Disclosure

This disclosure relates generally to ultrasonic flow meters and particularly to transducer assemblies used in ultrasonic flow meters.

Background to the Disclosure

After hydrocarbons have been removed from the ground, the fluid stream (either in a liquid phase or a gaseous phase) is transported from place to place via pipelines. It is desirable to know with accuracy the amount of fluid flowing in the stream. Very precise accuracy is expected when the fluid is changing hands, during a "custody transfer," for example. Even where custody transfer is not taking place, however, measurement accuracy is desirable, and in these various situations ultrasonic flow meters may be used.

An ultrasonic flow meter includes two or more transducer assemblies, each secured inside of a port in the meter body, also called a spool piece, of the flow meter. Thus, the spool piece and transducer assemblies create a pressure boundary that contains fluid flowing through the meter. To measure fluid flow through the meter, a pair of transducer assemblies is positioned along the inner surface of the spool piece, such that each transducer assembly faces the other. Each transducer assembly includes a piezoelectric element, and when an alternating current is applied to the piezoelectric element of the first transducer assembly, the piezoelectric element radiates an ultrasonic wave through the fluid being transported through the flow meter. When the wave is incident upon the piezoelectric element of the second transducer assembly, that transducer assembly responds by generating an electric signal. Later, an alternating current is applied to the second transducer assembly, and the piezoelectric element radiates an ultrasonic wave through the fluid in the flow meter. When the wave is incident upon the piezoelectric element of the first transducer assembly, an electric signal is generated. In this way, the transducer assemblies transmit and receive signals back and forth across the fluid stream.

Each transducer assembly is connected to a conductor or cable that extends through an end connector to the exterior of the spool piece and to a remote location, such as an electronics enclosure typically mounted to the exterior of the spool piece. The conductor carries the signal created by the piezoelectric elements to an acquisition board positioned within the electronics base enclosure, where the signal may be processed and subsequently used to determine the fluid flow rate through the meter.

A transformer provides impedance matching between the piezoelectric element and an acquisition device that ultimately receives the signal generated by the piezoelectric element. Thus, the piezoelectric element and the transformer are paired. Consequently, the transformer is typically positioned within the transducer assembly. With most conventional designs, when either the piezoelectric element or the transformer requires replacement, the entire transducer assembly is removed from the port in the spool piece. The size and wall thickness of the flow meter body influences the length of the transducer assembly. With flow meters of differing dimensions and wall thicknesses employed within a project or pipeline, a variety of transducer assemblies of varying sizes must be kept available as replacement parts. This complicates inventory control and can be costly.

BRIEF SUMMARY OF THE DISCLOSURE

These and other needs in the art are addressed herein. In one embodiment, an ultrasonic flow meter for measuring the flow of a fluid includes a transducer assembly that is configured to be adjustable so as to be compatible and fit within flow meters of various sizes and wall thicknesses. In one embodiment, the ultrasonic flow meter includes a meter body and a transducer assembly. The meter body includes a throughbore and a transducer port extending from an outer surface of the meter body to the throughbore. The transducer assembly is located in the transducer port, includes a central axis, and extends between a first end proximal the throughbore of the meter body and a second end spaced apart from the first end. The transducer assembly includes a piezoelectric capsule axially positioned adjacent the first end of the transducer assembly. The piezoelectric capsule comprises a transformer, a piezoelectric element axially spaced from the transformer, an axially-extendable wireway, and a conductor extending through the extendable wireway and electrically coupling the piezoelectric element with the transformer.

In another embodiment, a transducer assembly includes an elongate body that includes first and second ends. The transducer assembly also includes a piezoelectric element disposed adjacent the first end. In addition, the transducer assembly includes an axially-extendable wireway in the body and a conductor electrically coupled to the piezoelectric element and extending through the extendable wireway.

In addition, the transducer assembly may include a first member comprising a head portion at the first end, a leg extending axially away from the head portion, a latch tab extending radially from an end of the leg distal the head portion. A second member extends from the second end toward the first end and comprises a sleeve having an elongate receiving chamber defined by a chamber wall and configured to receive the leg therein, the sleeve comprising first and second apertures axially-spaced in the chamber wall. In such embodiment, each aperture is configured to capture the latch tab such that the length of the elongate body between the first and second ends is adjustable. Still further, the transducer assembly includes a piezoelectric element disposed adjacent the first end and an axially-extendable wireway in the first member and the second member. The transducer assembly also includes a conductor electrically coupled to the piezoelectric element and extending through the extendable wireway.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed exemplary embodiments, reference will now be made to the accompanying drawings, wherein.

NOTATION AND NOMENCLATURE

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The figures are not drawn to-scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus are to be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and on any number of other factors. The word "or" is used in an inclusive manner. For example, "A or B" means any of the following: "A" alone, "B" alone, or both "A" and "B." In addition, the word "substantially" means within a range of plus or minus 10%. As used herein and in the claims, the term "extendible" includes the meaning that an object is configured to be extended and reduced in a dimension, such as length, width, or thickness. An extendable object may be shown or described herein in its most extended state, its most reduce state, or in a mid-range condition of the extendible dimension.

In addition, the terms "axial" and "axially" generally mean along a given axis, while the terms "radial" and "radially" generally mean perpendicular to the axis. For instance, an axial distance refers to a distance measured along or parallel to a given axis, and a radial distance means a distance measured perpendicular to the axis.

DETAILED DESCRIPTION OF THE DISCLOSED EXEMPLARY EMBODIMENTS

Figure 1A:
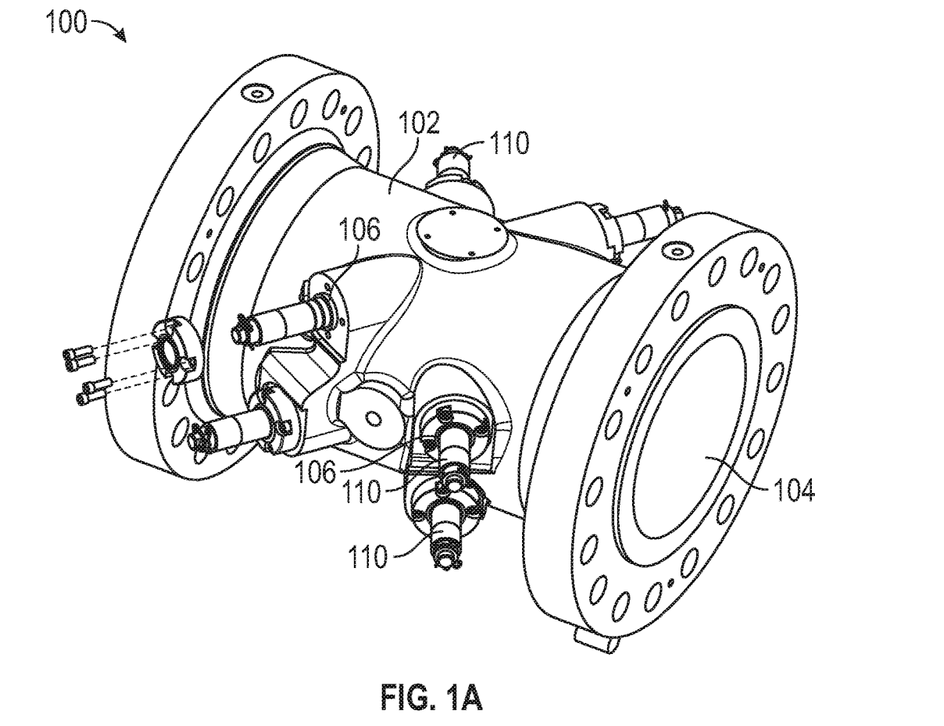
FIG. 1A shows a perspective view, an embodiment of a flow meter that includes extendable transducer assemblies in accordance with principles described herein.
Figure 1B:
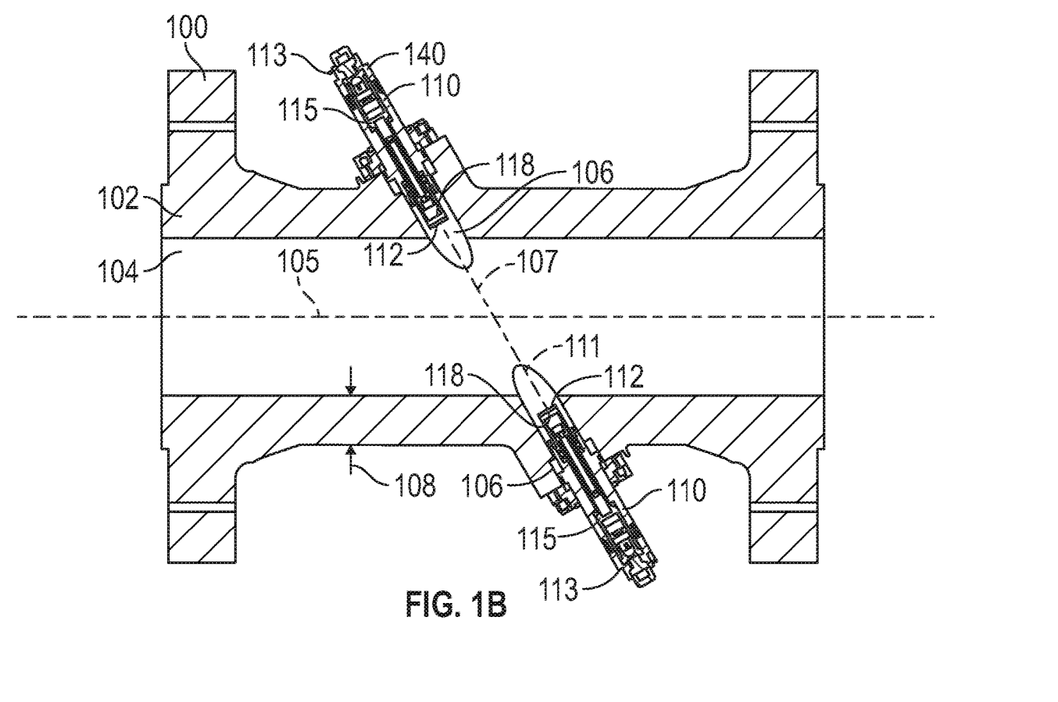
FIG. 1B shows a cross-sectional view of the top of the flow meter of FIG. 1.

Referring to FIG. 1A and FIG. 1B, in an exemplary embodiment, an ultrasonic flow meter 100 includes a meter body (i.e. spool piece) 102 having a throughbore 104 extending along a central axis 105 and includes a plurality of transducer ports 106 extending from an outer surface of the spool piece to the throughbore 104. Spool piece 102 includes a wall thickness 108. In meter 100, a plurality of extendable transducer assemblies 110 are mounted to spool piece 102. Each transducer assembly 110 is positioned within one of the transducer ports 106. Spool piece 102, suitable for placement between sections of a pipeline and has a predetermined size. During operation, a fluid (e.g., gas and/or liquid) to be measured may flow through the throughbore 104.

Referring now to FIG. 1B alone, an illustrative pair of transducer assemblies 110 are located within two opposing ports 106 extending along a common port axis 107 that is askew with respect to central axis. Each transducer assembly 110 has a central axis 111 aligned on port axis 107, and extends between a first end 112 proximal the throughbore 104 and a second end 113, spaced apart from end 112 and distal the throughbore 104 in this example. Each transducer assembly 110 includes a piezoelectric capsule 115 sealed within a housing 140. Capsule 115 includes a piezoelectric element 118 located adjacent first end 112. For simplicity, either transducer assembly 110 or piezoelectric capsule 115 may be called a transducer.

Capsules 115 are acoustic transceivers, and more particularly ultrasonic transceivers. The acoustic energy may be generated and received by a piezoelectric element 118 of each transducer. To generate an acoustic signal, the piezoelectric element is stimulated electrically by way of a sinusoidal signal, and it responds by vibrating. The vibration of the piezoelectric element generates the acoustic signal that travels through the measured fluid to the corresponding transducer of the transducer pair. Similarly, upon being struck by acoustic energy (i.e., the acoustic signal and other noise signals), the receiving piezoelectric element vibrates and generates a sinusoidal electrical signal that is detected, digitized, and analyzed by electronics associated with the meter.

Figure 2:
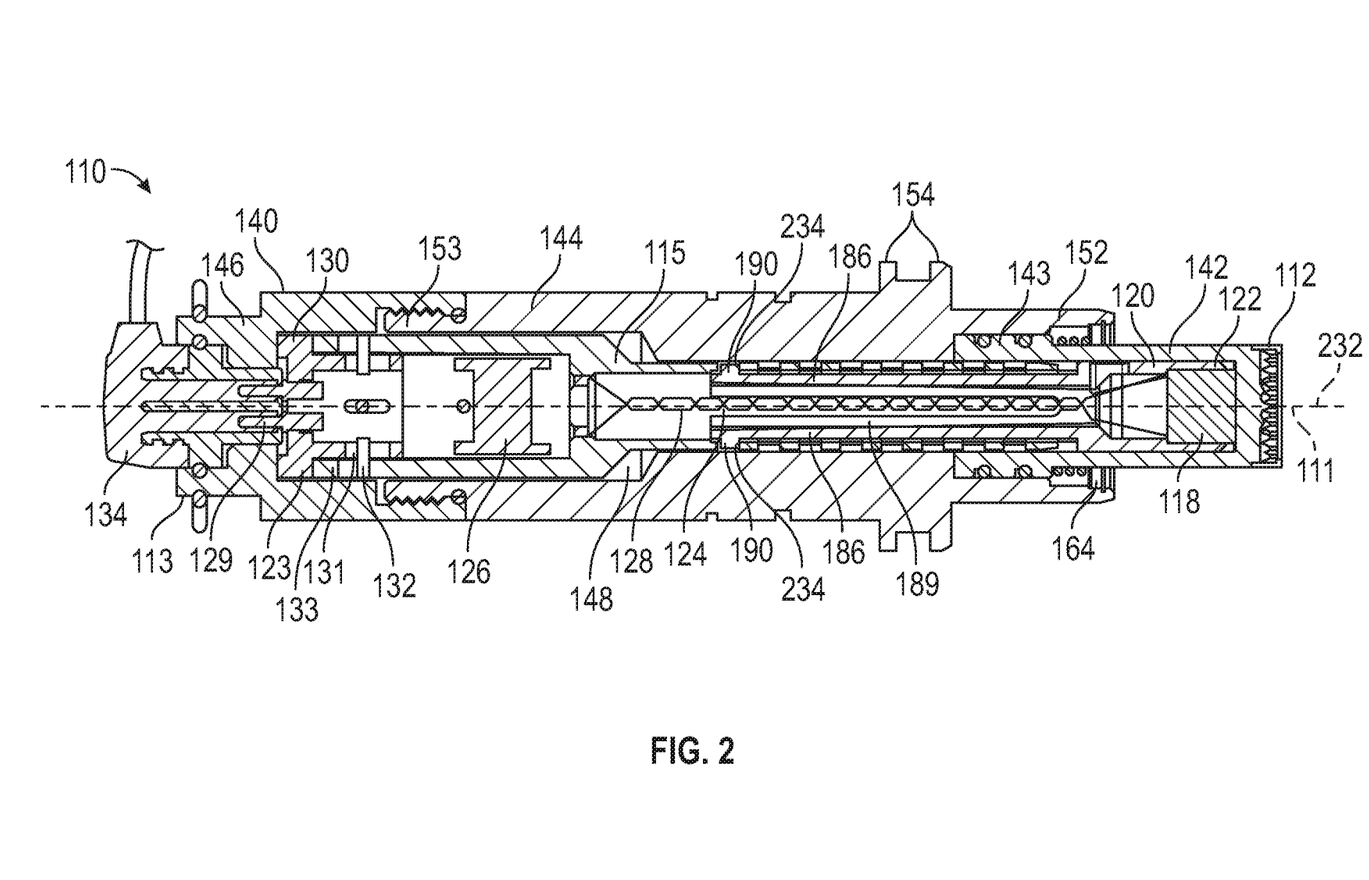
FIG. 2 shows a cross-sectional view of an extendable transducer assembly of FIG. 1 accordance with principles described herein.
Figure 3:
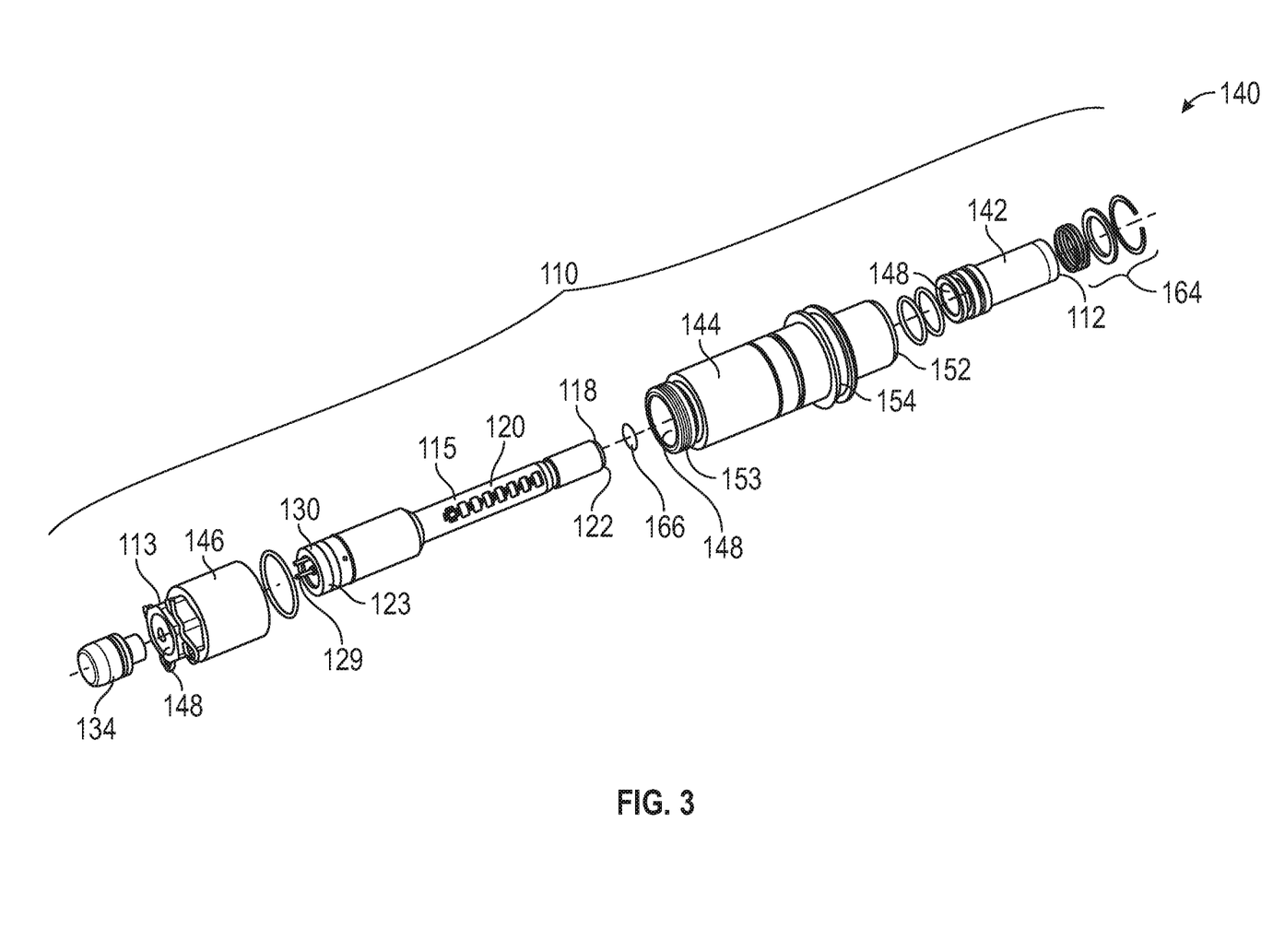
FIG. 3 shows an exploded view in perspective of the transducer assembly of FIG. 2.

FIG. 2 and FIG. 3 present closer views of a transducer assembly 110 showing that piezoelectric capsule 115 includes an axially-extendable, elongate body 120 extending along central axis 111 from a first end 122 to a second end 123, an axially-extendable wireway 124 between ends 122, 123, a transformer 126 located within body 120 proximal second end 123, and an end cap 130 at second end 123. Transformer 126 is axially spaced from piezoelectric element 118. A plurality of conductors 128 extends through the extendable wireway 124 and electrically couples the element 118 with transformer 126. Conductors 128 have sufficient length to accommodate the adjustable length of wireway 124 and body 120. Conductors 128 may be, as examples, coiled, kinked, foldable, or bendable. A plurality of conductor pins 129 held in the end cap 130 are electrically coupled between transformer 126 and a removable cord set 134. End cap 130 includes axially-extending slots 131 in a sidewall that receive pins 132 extending radially inward from capsule body 120, and a resilient member 133 is captured between end cap 130 and body 120. Arranged in this manner, capsule 115 is configured to extend and contract, allowing body 120 with pins 132 to move axially a prescribed distance (e.g., the axial length of slots 131) relative to cap 130. Resilient member 133 biases body 120 away from cap 130, or vice versa. With this mounting of cap 130 to body 120, piezoelectric capsule 115 is extendable to firmly but gently hold transformer 126 inside capsule 115 or to press piezoelectric element 118 toward or against the end of front cap 142. Resilient member 133 is, as examples, a coiled spring or a wave spring.

Continuing to reference FIG. 2 and FIG. 3, outer housing 140 includes a tubular, front cap 142, a tubular body 144, and a cord retainer 146, and a multi-diameter bore 148 that extends through retainer 146, body 144, and cap 142. Body 144 extends from a first end 152 to a threaded second end 153 and includes annular flanges 154 located along its outer surface between ends 152, 153. In various embodiments, the axial location of flanges 154 between ends 152, 153 can be altered to compensate for the wall thickness of the flow meter that is to receive transducer assembly 110. Body 144 may also be called a stalk.

In the assembly of FIG. 2, piezoelectric capsule 115 is received within bore 148 and resides within retainer 146, body 144, and cap 142. Cord retainer 146 is threadingly received on second end 153, cord set 134 is held within retainer 146, and an end 143 of front cap 142 is sealed within the body's first end 152 and held by various retaining members 164 that include an isolation spring, an isolation washer, and a retaining ring. Best shown in FIG. 3, an interface disc 166 is located between piezoelectric element 118 and the inner surface of front cap 142 at front end 112. In this embodiment, interface disc 166 is electrically insulating and is made from DuPont™ Kapton® polyimide film. Some embodiments use another material while still others lack an interface disc 166.

Figures 4, 5:
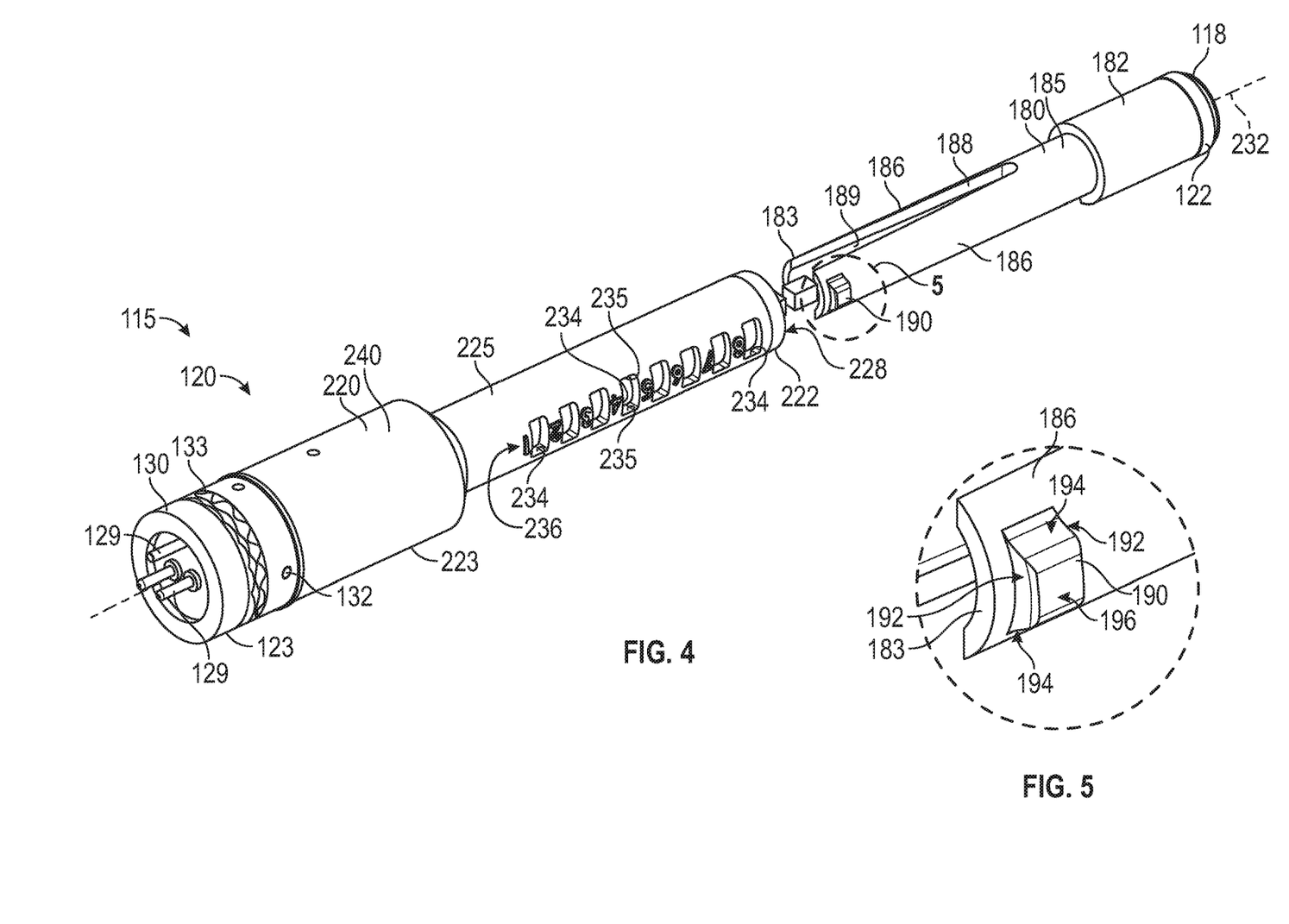
FIG. 4 shows a perspective view of the extendable, retractable piezoelectric capsule of the transducer assembly of FIG. 3.
FIG. 5 shows an enlarged view of a latch tab on the piezoelectric capsule of FIG. 4.

FIG. 4 provides additional details about piezoelectric capsule 115. Body 120 includes a first member 180 installable and removable from second member 220. First member 180 comprises a head portion 182 extending from first end 122 to a leg portion 185, which extends to a second end 183 of first member 180. Leg portion 185 has an outer diameter less than the outer diameter of head portion 182 and includes a pair of legs 186 extending axially away from the head portion 182 and a slot 188 between the legs. Slot 188 extends through only a part of leg region 185, and the non-slotted part may be called a central region of first member 180. Each leg 186 includes a latch tab 190 extending radially proximal the end 183. FIG. 5 shows a closer view of a latch tab 190 adjacent the end 183 on a leg 186. Latch tab 190 includes radially extending front & rear surfaces 192 facing towards ends 183, 122, and first and second side surfaces 194, which are configured as camming surfaces, smoothly extending in the circumferential and radial directions from the outer surface of leg 186 to a top surface 196. Fillets are included to form smooth transitions from one surface to another at camming surfaces 194. Top surface 196 is curved, following a circular path. Front & rear surfaces 192 are substantially perpendicular to axis 111.

In FIG. 4, leg portion 185 of first member 180 includes a tubular wall divided lengthwise by slot 188, which is tapered, being wider at end 183. A multi-diameter throughbore 189 extends entirely through leg portion 185 and head portion 182. Piezoelectric element 118 is disposed in or adjacent throughbore 189 at first end 122.

Figure 6:
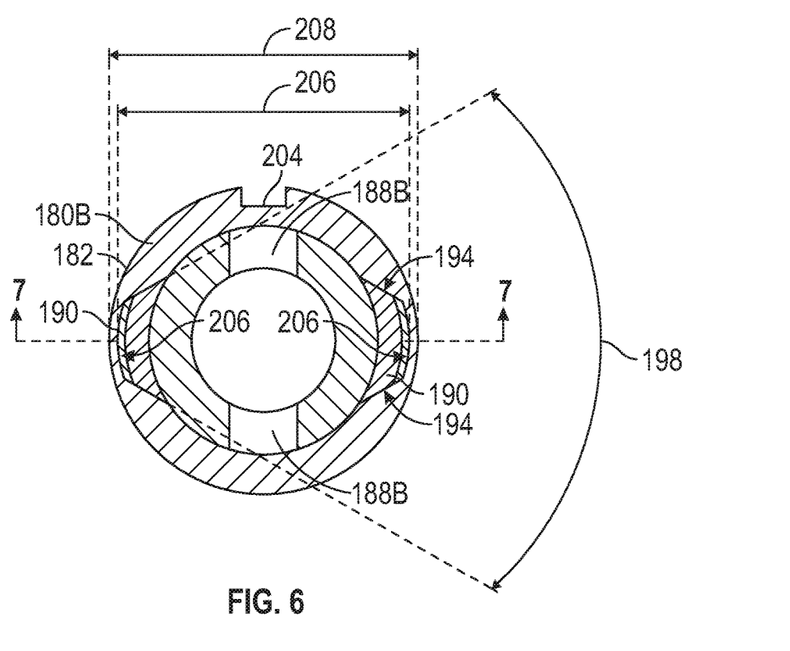
FIG. 6 shows an end view of the first member of the piezoelectric capsule of FIG. 4.
Figure 7:
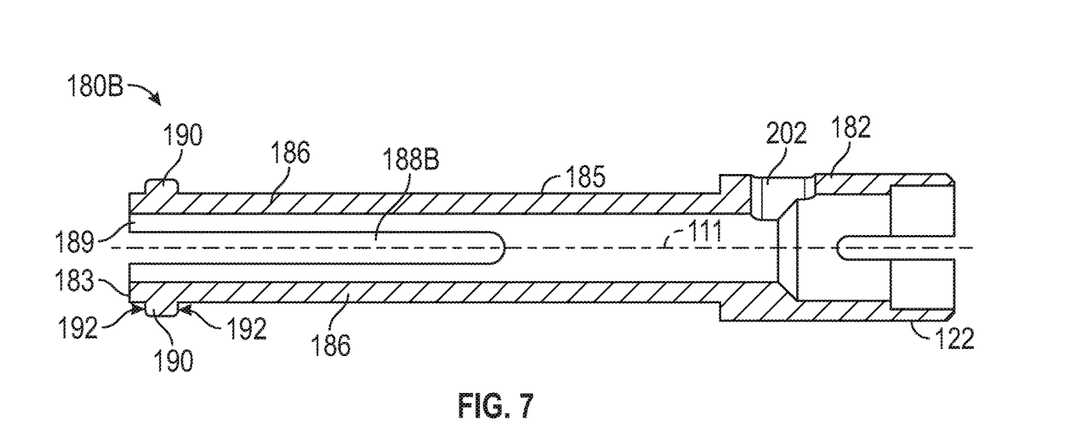
FIG. 7 shows a cross-sectional view of the first member of FIG. 6.

FIGS. 6 and 7 show another exemplary embodiment, a first member 180B that includes the same features as member 180 in FIG. 4 and FIG. 5; however, a straight slot 188B replaces the tapered slot 188. The sidewalls of slot 188B are straight as they extend axially from a mid-location along leg portion 185 through the end 183. Member 180B includes a radially-extending aperture 202 and an external slot 204 in head portion 182 to provide a path for a conductor 128 to reach the front, exterior surface of a piezoelectric element 118 (FIG. 4). In FIG. 6, first and second camming surfaces 194 on latch tabs 190 include flat portions that are oriented at an angle 198 from each other. In FIG. 6, angle 198 has a value of substantially 60 degrees. Other embodiments may use an angle 198 that is greater or less than 60 degrees. Some embodiments use another shape for camming surfaces 194; for example, some camming surfaces are entirely curved, lacking flat portions. The outer diameter 206 of top surface 196 is less that the outer diameter 208 of head portion 182. First member 180B is interchangeable with first member 180 within a piezoelectric capsule 115.

Figure 8:
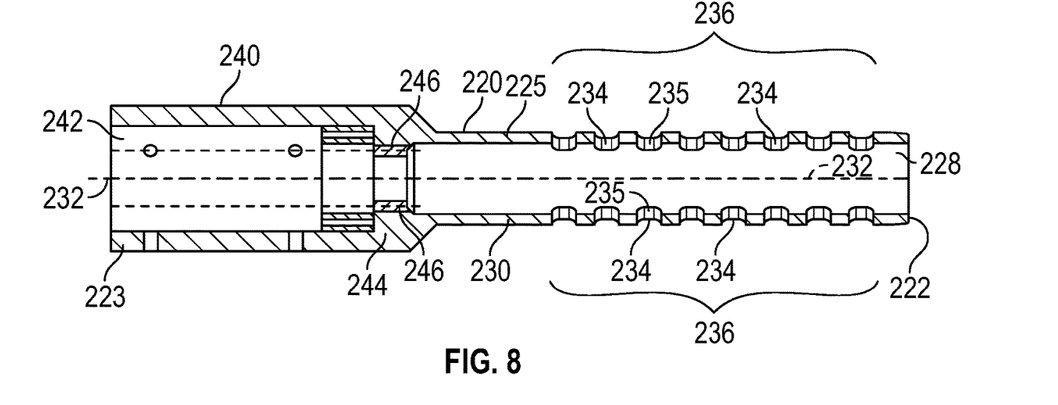
FIG. 8 shows a cross-sectional view of the second member of the piezoelectric capsule of FIG. 4.

Referring now to FIG. 4 and FIG. 8, second member 220 extends from a sleeve 225 at a first end 222 to a body portion 240 at a second end 223. Sleeve 225 includes an elongate receiving chamber 228 defined by a chamber wall 230 extending along a sleeve axis 232. Sleeve 225 includes a plurality of axially-spaced apertures 234, which may also be called latch slots. In this example, an aperture 234 is rectangular and includes circumferentially-spaced sides 235 intersecting the wall of chamber 228. As best shown in FIG. 8, apertures 234 are grouped as pairs of two apertures 234 located at a same axial position along axis 232 and circumferentially spaced-apart. The pairs define first and second rows 236 of aligned apertures 234, each aperture 234 being configured to capture a latch tab. The rows 236 are circumferentially spaced about the sleeve axis 232, being located 180 degrees apart in this embodiment. Eight pairs of aligned apertures 234 are shown, but other embodiments may have more or fewer than eight pairs of apertures 234. Continuing to reference FIG. 8, body portion 240 of second member 220 is tubular and includes a multi-diameter bore 242 extending from second end 223, an internal wall 244 at the intersection of body portion 240 and sleeve 225, and a plurality of through bores 246 extending axially through the wall 244 to provide passages for conductors 128.

Referring to FIGS. 2, 7, and 8, wireway 124 includes receiving chamber 228 of second member 220 and slot 188 of first member 180. Wireway 124 also includes bore 242 and bores 246 of second member 220 and throughbore 189 of first member 180, which intersects slot 188. Chamber 228 is configured to receive legs 186, and each aperture 234 is configured to capture a latch tab 190, to latch the location of first member 180 relative to second member 220 at various axial positions, to achieve various lengths for capsule body 120. Moreover, each pair of aligned apertures 234 is configured to capture concurrently the two latch tabs 190 on the two legs 186, as shown in the example of FIG. 2.

Referring to FIG. 4 and FIG. 2, the operation of capsule 115 includes aligning sleeve axis 232 with axis 111 and first member 180. Legs 186 are configured to be flexed radially inward toward the sleeve axis 232 while the legs 186 are moved in a direction toward body portion 240 and transformer 126 in order to install legs 186 inside chamber 228. Legs 186 can be move axially until latch tabs 190 are captured within a pair of apertures 234. Legs 186 are configured such that first member 180 cannot move axially with respect to the second member 220 when the latch tabs 190 are captured in any of the apertures 234 of rows 236. Legs 186 are also configured such that the first member 180 can rotate about the sleeve axis 232 within sleeve 225 when latch tabs 190 are captured in any pair of apertures 234 and also when the latch tab is not captured in an aperture 234. When latch tabs 190 are captured in a pair of apertures 234, and legs 186 are rotated about sleeve axis 232 relative to second member 220, tabs 190 are biased out of engagement with apertures 234 that held them. In this process, camming surfaces 194 of tabs 190 ride on the circumferentially-spaced sides 235 of apertures 234, pressing tabs 190 and legs 186 inward toward axis 232 and causing top surfaces 196 to rest against the surface of receiving chamber 228. Thus, tabs 190 may be removed or released from apertures 234 without a radial force being exerted on top surface 196. For example, tabs 190 may be released without an assembler pressing surface 196 radially inward before or during rotation of member 180 relative to member 220. This configuration may be described as "rotate-to-release." When released or not engaged, first member 180 may be moved axially with respect to second member 220 while tabs 190 are disengaged from the rows of apertures 234. As examples, in various embodiments, first member 180 may be rotated by 45 degree, 90 degrees, or 135 degrees, or by another suitable angle to disengage latch tabs 190 from any pair of apertures 234.

Figure 9:
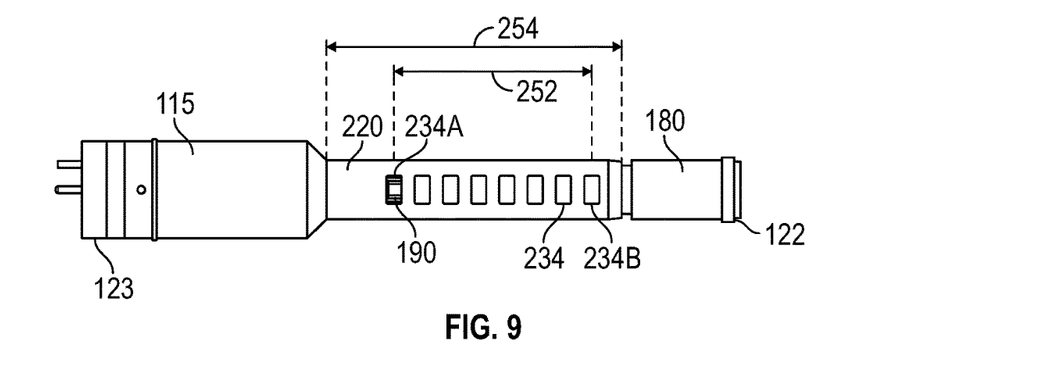
FIG. 9 shows a side view of the piezoelectric capsule of FIG. 4 assembled and the configured with a short length.
Figure 10:
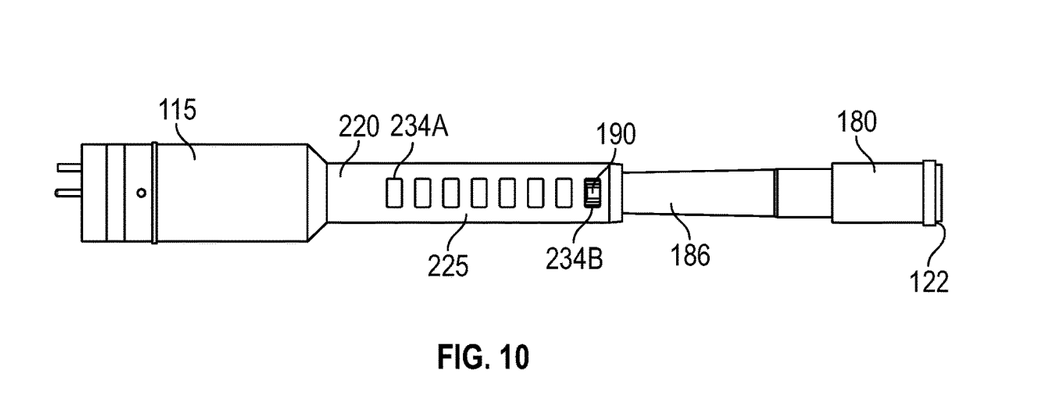
FIG. 10 shows a side view of the piezoelectric capsule of FIG. 4 assembled and the configured with a long length.

FIG. 9 demonstrates the shortest length of piezoelectric capsule 115 of this embodiment, with latch tabs 190 captured within the pair of apertures 234A proximal second end 123 and distal the first end 122. FIG. 9 corresponds to the configuration of capsule 115 shown in FIG. 2. FIG. 10 demonstrates the longest length of capsule 115, with latch tabs 190 captured within the pair of apertures 234B proximal the first end 122. In this position, a majority of the length of each leg 186 is outside of sleeve 225. First member 180 may be extended and retracted with respect to second member 220 such that latch tabs 190 are captured in any of the pairs apertures 234 represented in FIG. 9 and FIG. 10. In the present embodiment, the distance 252 between apertures 234A and apertures 234B is 67% of the length 254 of sleeve 225. In some embodiments, distance 252 is selected from a value in the range 10% to 67% of the length 254 of sleeve 225. In some embodiments distance 252 is greater than 60% of the length 254. In some other embodiments, distance 252 is less than 20% of the length 254, and some of these embodiments with shorter distances 252 have fewer than eight pairs of apertures 234.

Considering FIG. 1B for perspective, the length of capsule 115 that is selected and set for use in a given flow meter will be based in part on the wall thickness 108 of the flow meter and the angular orientation of ports 106 relative to flow meter axis 105, which influence the length of port 106. To accommodate the selected the length of capsule 115, the outer housing 140 may be different from the example shown in FIG. 1A and FIG. 2. For example, the axial location of flanges 154 along body 144 may be different to change what length portion of capsule 115 extends within port 106, and what remaining portion of capsule 115 remains outside port 106 or spool piece 102. Therefore, piezoelectric capsule 115 is a transducer assembly that is configured to fit within flow meters of various sizes and wall thicknesses.

In contrast to the side surfaces 194 of latch tabs 190 in FIG. 4 and FIG. 5, in some embodiments of capsule 115, the side surfaces of latch tabs do not perform effectively as camming surfaces when an assembler attempts to rotate a first member relative to a second member while a latch tab is held within a slot on a second member. For example, the side surfaces 194 of latch tabs 190 may be steeper that described above, having an angle 198 (FIG. 6) less than 10 degrees, as an example. Such embodiments are configured to change length when a user presses inward on latch tabs 190 to release them from slots 234 before the first member is moved axially or rotated with respect to the second member 220. This configuration may be described as "press-to-release."

Although first members 180, 180B were described as each having a pair of latch tabs 190, and second member 220 was described as having first and second rows 236 of apertures 234, in some embodiments of piezoelectric capsule 115, a first member has only one latch tab 190, and a second member has a single row 236 of apertures 234. Such combinations of first and second members may also be configured as rotate-to-release or as press-to-release.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatuses, and processes described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. An ultrasonic flow meter for measuring the flow of a fluid, comprising:
  a meter body including a throughbore and a transducer port extending from an outer surface of the meter body to the throughbore; and
  a transducer assembly disposed in the transducer port, wherein the transducer assembly has a central axis, and extends between a first end proximal the throughbore of the meter body and a second end spaced apart from the first end, the transducer assembly comprising a piezoelectric capsule axially positioned adjacent the first end of the transducer assembly; and
  wherein the piezoelectric capsule comprises:
    a transformer;
    a piezoelectric element axially spaced from the transformer;
    an axially-extendable wireway;
    a conductor extending through the extendable wireway and electrically coupling the piezoelectric element with the transformer;
    a first member comprising a head portion and a pair of legs extending axially away from the head portion, at least one leg comprising a latch tab extending therefrom; and
    a second member comprising a sleeve having an elongate receiving chamber defined by a chamber wall and configured to receive the legs therein, the sleeve comprising at least a row of aligned apertures in the chamber wall, wherein each of the apertures is configured to capture the latch tab.

2. The flow meter of claim 1 wherein the sleeve comprises a sleeve axis and wherein the ends of the legs are configured to flex radially inward toward the sleeve axis upon the legs being moved in a direction toward the transformer and before the latch tab is captured within an aperture.

3. The flow meter of claim 1 wherein the sleeve comprises a sleeve axis, and wherein the legs are configured such that, when the latch tab is captured in a first aperture of the row and the legs are rotated about the sleeve axis, the tab is biased out of engagement with the first aperture.

4. The flow meter of claim 1 wherein the sleeve comprises a sleeve axis;
wherein the legs are configured such that the first member cannot move axially with respect to the second member when the latch tab is captured in a first aperture; and
wherein the legs are configured such that the first member can rotate about the sleeve axis within the sleeve when the latch tab is captured in the first aperture and also when the latch tab is not captured in the first aperture.

5. The flow meter of claim 1 wherein the latch tab includes a camming surface; and
wherein the latch tab is configured such that rotation of the first member relative to the second member biases the tab out of engagement with the aperture.

6. The flow meter of claim 1 wherein the sleeve comprises a sleeve axis and wherein each leg comprises a latch tab; and
wherein the sleeve comprises a plurality of axially-spaced pairs of apertures, the pairs defining two rows of aligned apertures, each aperture being configured to capture a latch tab, and the rows being circumferentially spaced about the sleeve axis.

7. The flow meter of claim 6 wherein the legs are configured such that, when the latch tab of each leg is captured in one of the apertures of a pair of apertures and the first member is rotated about the sleeve axis, the tab of each leg is biased out of engagement with an aperture.

8. A transducer assembly comprising:
an elongate body having an adjustable length and first and second ends;
a piezoelectric element disposed adjacent the first end;
an axially-extendable wireway in the body
a conductor electrically coupled to the piezoelectric element and extending through the extendable wireway;
a first member comprising a head portion, a pair of legs extending axially away from the head portion and a slot between the legs, at least one leg comprising a latch tab extending therefrom;
a second member comprising a sleeve having an elongate receiving chamber defined by a chamber wall and configured to receive the legs therein;
wherein the piezoelectric element is mounted to the first member and wherein the extendable wireway comprises the receiving chamber and the slot; and
wherein the sleeve comprises at least a row of aligned apertures in the chamber wall, wherein each of the apertures is configured to capture the latch tab.

9. The transducer assembly of claim 8 wherein the sleeve comprises a sleeve axis and wherein the ends of the legs are configured to flex radially inward toward the sleeve axis upon the legs being moved into the receiving chamber and before the latch tab is captured within an aperture.

10. The transducer assembly of claim 8 wherein the sleeve comprises a sleeve axis, and wherein the legs are configured such that, when the latch tab is captured in a first aperture of the row and the legs are rotated about the sleeve axis, the tab is biased out of engagement with the first aperture.

11. The transducer assembly of claim 8 wherein the sleeve comprises a sleeve axis; and
wherein the legs are configured such that the first member cannot move axially with respect to the second member when the latch tab is captured in a first aperture of the row; and
wherein the legs are configured such that the first member can rotate about the sleeve axis within the sleeve when the latch tab is captured in the first aperture and also when the latch tab is not captured in the first aperture.

12. The transducer assembly of claim 8 wherein the latch tab includes a camming surface; and
wherein the latch tab is configured such that rotation of the first member relative to the second member biases the tab out of engagement with the first aperture.

13. The transducer assembly of claim 8 wherein the sleeve comprises a sleeve axis and wherein each leg comprises a latch tab; and
wherein the sleeve comprises a plurality of axially-spaced pairs of apertures, the pairs defining two rows of aligned apertures, each aperture being configured to capture a latch tab, and the rows being spaced 180 degrees apart about the sleeve axis.

14. The transducer assembly of claim 13 wherein the legs are configured such that, when the latch tab of each leg is captured in one of the apertures of a pair of apertures and the first member is rotated about the sleeve axis, the tab of each leg is biased out of engagement with an aperture.

15. A transducer assembly comprising:
an elongate body including:
first and second ends;
a first member comprising a head portion at the first end, a leg extending axially away from the head portion, a latch tab extending radially from an end of the leg distal the head portion;
a second member extending from the second end toward the first end and comprising a sleeve having an elongate receiving chamber defined by a chamber wall and configured to receive the leg therein, the sleeve comprising first and second apertures axially-spaced in the chamber wall, each aperture being configured to capture the latch tab such that the length of the elongate body between the first and second ends is adjustable;
a piezoelectric element disposed adjacent the first end;
an axially-extendable wireway in the first member and the second member; and
a conductor electrically coupled to the piezoelectric element and extending through the extendable wireway.

16. The transducer assembly of claim 15 wherein the sleeve comprises a sleeve axis;
wherein the leg includes an outer surface;
wherein the latch tab includes a top surface and a camming surface, the camming surface extending in the circumferential and radial directions from the outer surface of the leg to the top surface of the latch tab;
wherein the camming surface is configured to ride on a side of the first or second aperture when the first member is rotated about the sleeve axis relative to the second member to cause the end of the leg to flex radially inward toward the sleeve axis, biasing the tab out of engagement with the first or second aperture.

* * * * *